(12) United States Patent
Carper

(10) Patent No.: US 9,111,126 B2
(45) Date of Patent: *Aug. 18, 2015

(54) BIOMETRIC AUTHENTICATION SYSTEM AND BIOMETRIC SENSOR CONFIGURED FOR SINGLE USER AUTHENTICATION

(71) Applicant: TEC SOLUTIONS, INC., Burlingame, CA (US)

(72) Inventor: Todd Alan Carper, Burlingame, CA (US)

(73) Assignee: TEC SOLUTIONS, INC., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,153

(22) Filed: Apr. 29, 2014

(65) Prior Publication Data

US 2014/0232526 A1 Aug. 21, 2014

Related U.S. Application Data

(63) Continuation of application No. 12/835,088, filed on Jul. 13, 2010, now Pat. No. 8,799,167.

(51) Int. Cl.
*G06F 21/00* (2013.01)
*G06K 9/00* (2006.01)
*G06Q 20/10* (2012.01)
*G06Q 40/02* (2012.01)
*G06F 21/32* (2013.01)

(52) U.S. Cl.
CPC ............ *G06K 9/00087* (2013.01); *G06F 21/32* (2013.01); *G06K 9/00046* (2013.01); *G06Q 20/1085* (2013.01); *G06Q 40/02* (2013.01); *G06F 2221/033* (2013.01); *G06F 2221/034* (2013.01)

(58) Field of Classification Search
CPC .................................................. G06K 9/00046
USPC ............................................ 382/124; 705/51
See application file for complete search history.

(56) References Cited

U.S. PATENT DOCUMENTS

| | | | |
|---|---|---|---|
| 6,317,544 B1 * | 11/2001 | Diehl et al. .................... | 385/115 |
| 6,330,345 B1 | 12/2001 | Russo et al. | |
| 7,010,148 B2 | 3/2006 | Irving et al. | |
| 7,165,716 B1 * | 1/2007 | Modl et al. .................... | 235/379 |
| 7,194,113 B2 * | 3/2007 | Greschitz et al. ............. | 382/115 |
| 7,634,117 B2 * | 12/2009 | Cho .............................. | 382/124 |
| 7,916,908 B1 * | 3/2011 | Thomas ........................ | 382/124 |
| 8,331,775 B2 * | 12/2012 | Harper ........................... | 396/15 |

(Continued)

OTHER PUBLICATIONS

Weinberger, Joshua; "Special Supplement: Fighting Fraud—Finger on the pulse—In the Ongoing battle to Thwart Fraudsters, Biometrics . . . " The Banker; Dec. 2006.*

(Continued)

*Primary Examiner* — Edward Chang
(74) *Attorney, Agent, or Firm* — Volentine & Whitt, PLLC

(57) ABSTRACT

A biometric authentication system includes a biometric sensor configured for single user authentication. The biometric sensor can be configured for single user authentication through an enrollment procedure in which one or more sensing parameters are adjusted based on unique characteristics of the user. Thereafter, the user can be authenticated by capturing biometric data using the adjusted sensing parameters and comparing the captured biometric data against stored template data.

18 Claims, 8 Drawing Sheets

(56) References Cited

U.S. PATENT DOCUMENTS

| | | | |
|---|---|---|---|
| 2002/0138438 A1* | 9/2002 | Bardwell | 705/51 |
| 2006/0000898 A1* | 1/2006 | Bonalle et al. | 235/380 |
| 2006/0035707 A1* | 2/2006 | Nguyen et al. | 463/29 |
| 2007/0040017 A1* | 2/2007 | Kozlay | 235/380 |
| 2007/0290124 A1 | 12/2007 | Neil et al. | |
| 2009/0252384 A1 | 10/2009 | Dean et al. | |
| 2010/0158327 A1* | 6/2010 | Kangas et al. | 382/124 |

OTHER PUBLICATIONS

Ali Pabrai, Uday O. "Biometric for PC-user authentication: A primer"; Access Control & Security systems Integration, suppl. iSecurity; Feb. 2001.*

* cited by examiner

BIOMETRIC AUTHENTICATION SYSTEM AND BIOMETRIC SENSOR CONFIGURED FOR SINGLE USER AUTHENTICATION

CROSS-REFERENCE TO RELATED APPLICATION

This application is a continuation of U.S. patent application Ser. No. 12/835,088 filed on Jul. 13, 2010, now U.S. Pat. No. 8,799,167 issued on Aug. 5, 2014, the subject matter of which is hereby incorporated by reference.

BACKGROUND

Embodiments of the inventive concept relate generally to biometric sensing technologies, and more particularly, to biometric sensors configured for single user authentication.

A biometric sensor is a device that senses one or more characteristics of a biological subject, such as a human, and converts those characteristics into biometric information that can be readily measured or analyzed. Common examples of biometric sensors include devices for sensing voice patterns, facial features, fingerprints, retinal patterns, and bone density, to name just a few.

Biometric sensors typically comprise one or more transducer elements for converting biological signals into electrical or mechanical signals. For instance, some fingerprint sensors use capacitive elements to convert electrical charges of the skin into an electronic fingerprint image. Similarly, some biometric sensors use imaging elements to convert reflected or emitted light into an electronic image of a face, retina, or fingerprint.

Some biometric sensors are "active" in the sense that they project signals onto the biological subjects to identify a response or other feature, and some biometric sensors are "passive" in the sense that they perform sensing without projecting signals onto the biological subjects. Examples of "active" sensors include those that shine light on subjects, such as backlight or a targeted laser light, and those that project certain types of vibrations, such as ultrasound waves.

Although various types of biometric sensors have long been used to gather biological data in scientific, medical, and forensic applications, biometric sensors have only recently begun to achieve widespread adoption in security applications. At present, biometric sensors are increasingly used to authenticate users in a variety of security applications including computer security, automotive security, building and home security, and others.

In a typical biometric authentication system, a biometric sensor captures biometric information from a subject. The captured information is then compared with a plurality of stored templates to determine whether the subject should be authenticated. The templates typically comprise biometric information previously collected from a group of authorized subjects. For instance, in an image-based authentication system, the stored templates typically comprise images of authorized subjects' faces or fingerprints, or encoded information such as Fourier or cosine transform coefficients related to the images. Authentication is performed by comparing the captured biometric information with the templates and authenticating the subject only upon detecting a match between the captured biometric information and one or more of the templates.

The performance of a biometric authentication system is typically measured by the frequency with which it authenticates subjects that should be rejected—referred to as the false positive rate—and the frequency with which it rejects subjects that should be authenticated—referred to as the false negative rate. Conventional biometric authentication systems can achieve false positive and false negative rates of about 1:100,000, meaning that the captured biometric information generates a spurious hit or miss about once in every 100,000 comparisons with the stored templates. Accordingly, where the stored templates comprise several thousand or even million images from various subjects, there is a good chance that false positives and false negatives will occur.

False positives and false negatives occur for a variety of reasons in conventional biometric authentication systems. False negatives can occur, for instance, where too many traits are used to match a subject against a template. As an example, where a captured fingerprint image is required to match every nuance of a stored fingerprint image, there is a good chance that even a correct fingerprint will be erroneously rejected due to minor variations in fingerprinting conditions, such as dirt, moisture, finger positioning, or even minor changes in the subject's fingerprint over time. False positives, on the other hand, can occur where too few traits are used to match a subject against a template. As an example, where only one or two traits of a fingerprint image are used for authentication, there is a significant possibility that the wrong subjects will match those one or two traits by random chance.

Another source of false positives and false negatives lies in differences between the biometric sensors used to authenticate subjects, and the biometric sensors used to record the template information. Such differences can arise, for instance, from variances in sensor manufacturing processes. These differences can cause the sensors to produce different measurements of minute traits, even traits from the same subject. As a result, they can lead to inaccurate authentication.

SUMMARY

Embodiments of the inventive concept provide various techniques and technologies that can improve the accuracy of biometric authentication systems. Certain embodiments provide biometric authentication systems and related methods in which a biometric sensor is calibrated for use by a single individual. In other words, certain parameters of the sensor are set according to characteristics of the single individual so that features of the single individual can be readily identified in subsequent authentication operations.

According to one embodiment of the inventive concept, a biometric authentication system comprises a biometric sensor and a processor. The biometric sensor is configured to capture biometric information using one or more sensing parameters derived from biometric data of only one person. The processor is configured to compare the captured biometric information with stored template information to determine whether to authenticate a user.

In certain embodiments, the template information comprises biometric information captured from the only one person.

In certain embodiments the template information is captured using the one or more sensing parameters.

In certain embodiments, the one or more sensing parameters comprise focus, resolution, or contrast parameters of an imaging device.

In certain embodiments, the one or more sensing parameters cause the biometric sensor to capture biometric information from the only one person with greater fidelity compared with biometric information from other individuals.

In certain embodiments, the biometric sensor is a fingerprint sensor.

In certain embodiments, the biometric sensor is embedded in a smartcard.

In certain embodiments, the processor is configured to communicate with an automatic teller machine to regulate access to a bank account based on biometric information submitted to the biometric sensor.

In certain embodiments, the biometric authentication system further comprises a radio frequency identification tag coupled to the processor for communication with an access controller.

According to another embodiment of the inventive concept, a biometric authentication system comprises a biometric sensor, an enrollment component, and an authentication component. The biometric sensor is configured to capture biometric data from a user. The enrollment component is configured to receive enrollment biometric data captured by the biometric sensor from a single individual, and to generate one or more sensing parameters for the biometric sensor based on the received biometric data. The authentication component is configured to receive authentication biometric data captured by the biometric sensor using the one or more sensing parameters, and to determine whether to authenticate a user by comparing the authentication biometric data with stored template information captured from the single individual.

In certain embodiments, the stored template information is captured using the one or more sensing parameters generated by the enrollment component.

In certain embodiments, the authentication biometric data and the template information that are compared with each other each comprise an unabbreviated sample of biometric data captured by the biometric sensor.

In certain embodiments, the biometric authentication system further comprises an access controller configured to actuate a secured entity to permit access by an authenticated user.

In certain embodiments, the biometric sensor is integrated in an access badge for a building.

According to still another embodiment of the inventive concept, a method of operating a biometric authentication system comprises calibrating a biometric sensor to sense biometric data with sensing parameters based on biometric characteristics of a single user, and authenticating the single user by capturing biometric data using the calibrated biometric sensor, and comparing the captured biometric data with previously stored biometric data.

In certain embodiments, the previously stored biometric data is captured using the calibrated biometric sensor In certain embodiments, calibrating the biometric sensor comprises performing an iterative process wherein each iteration comprises capturing biometric data from the single user and updating sensing parameters of the biometric sensor based on the captured biometric data.

In certain embodiments, the iterative process terminates after a predetermined number of iterations.

In certain embodiments, the biometric sensor is a fingerprint sensor.

In certain embodiments, the method further comprises, upon authenticating the single user, communicating with an access controller to allow the single user to access to a secured entity.

BRIEF DESCRIPTION OF THE DRAWINGS

Embodiments of the inventive concept are described below with reference to the accompanying drawings. In the drawings, like reference numbers denote like features.

DETAILED DESCRIPTION OF EMBODIMENTS

Figure 1:
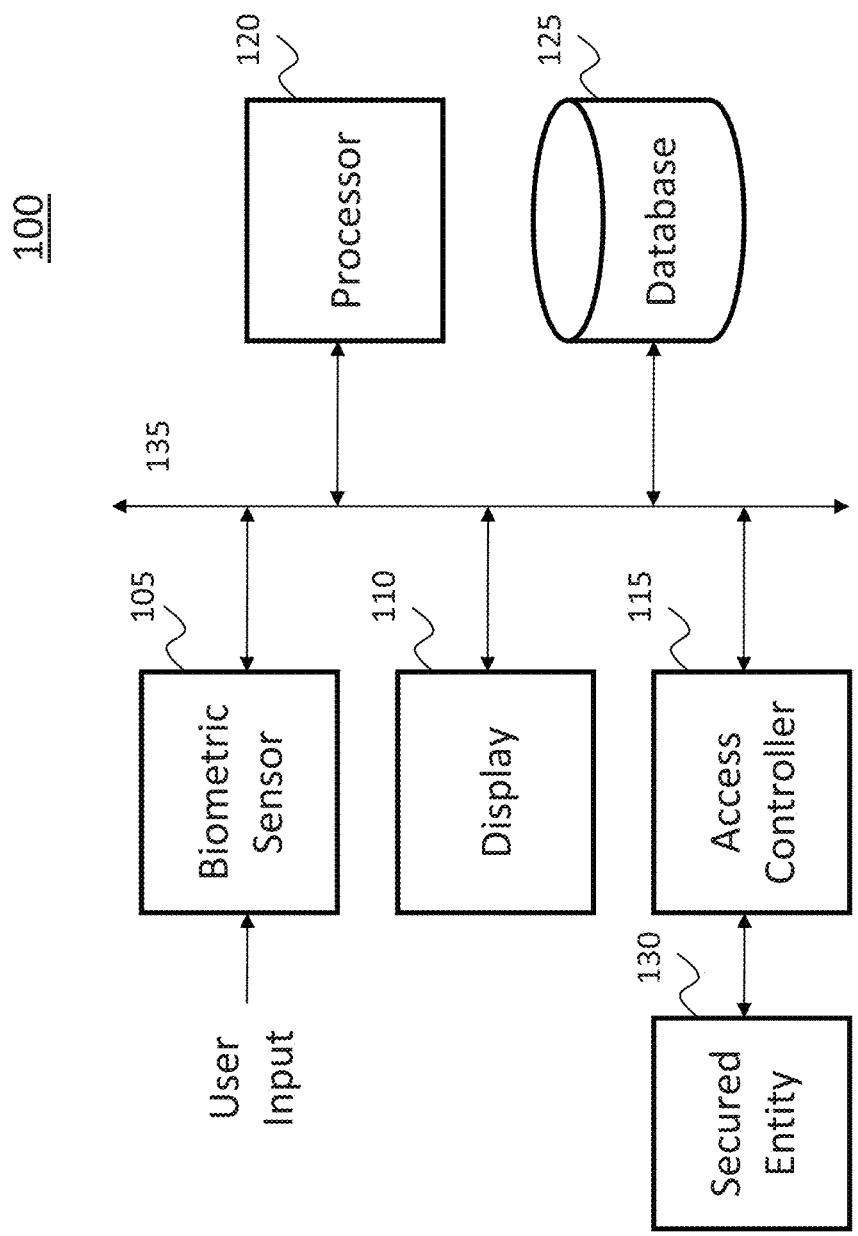
FIG. 1 is a diagram illustrating a biometric authentication system according to an embodiment of the inventive concept.

Selected embodiments of the inventive concept will now be described with reference to the corresponding drawings. These embodiments are presented as teaching examples and should not be construed to limit the scope of the inventive concept.

In general, embodiments of the inventive concept relate to biometric authentication systems using biometric sensors configured for single user authentication. By using biometric sensors configured for single user authentication, these systems can produce lower false positive and false negative rates compared with conventional biometric authentication systems.

The biometric sensors can be configured for single user authentication through an enrollment procedure performed by an owner. As an example, suppose the biometric sensor comprises a fingerprint sensor in an access badge. Upon issuance of the access badge, the owner performs an enrollment procedure to adjust various parameters of the fingerprint sensor. The parameters are adjusted according to the owner's fingerprint characteristics in order to improve the sensor's recognition of the owner's fingerprint. The adjusted parameters can comprise, for instance, the sensor's sensitivity, focus, aperture size, resolution, or contrast. Characteristics that can influence the adjusted values of the parameters include, for instance, the amount of moisture in the owner's skin, the size and shape of lines in the skin, and aberrations such as scars.

In certain embodiments, the enrollment procedure comprises an iterative tuning process in which the biometric sensor captures multiple samples of biometric traits and adjusts its parameters after each sample until a desired level of sample quality is achieved. For instance, in the fingerprint example the biometric sensor can capture multiple fingerprint images and adjust its focus, resolution, contrast or sensitivity after each capture. Once the sensor achieves desired sensing characteristics, the iterative tuning process terminates and the resulting parameters are stored for later use in authenticating the owner. The quality of sensing characteristics can be judged in each iteration, for instance, through an automated mechanism, such as image analysis software, or they can also be judged by human observation.

The adjustment of sensor parameters can be performed in software, hardware, or a combination of hardware and software. In some embodiments, for instance, the adjustment is made by setting certain parameters in firmware to control the focus, sensitivity, or other parameters of an imaging device. In other embodiments, the adjustments can be performed by making modifications in reconfigurable hardware.

After the enrollment procedure, the parameters remain fixed so that they can be used in subsequent authentication operations. Because the fixed parameters are tuned or calibrated based on specific characteristics of the owner, the calibrated biometric sensor tends to perform relatively high quality sensing for the owner, and lower quality sensing for other people, making it easier to distinguish between the owner and others. In other words, because the sensor is calibrated to the owner, it will sense the owner's features with a relatively high level of fidelity, while features of other people may be blurry, distorted, or absent altogether.

In various alternative embodiments, the tunable parameters can be adjusted either in combination or independent of each other. As an example, the focus of an image sensor can be iteratively adjusted until an acceptable focus is achieved, without adjusting other parameters. Alternatively, the focus can be adjusted together with other parameters, such as brightness or contrast, until overall image quality reaches an acceptable level.

In addition, different biometric sensors can have different tunable parameters. Certain image sensors, for instance, can be tuned to sense different levels of contrast, pressure, brightness, resolution, and so on. Similarly, certain voice sensors can be adjusted to have different levels of sensitivity to volume and frequency based on the characteristics of an owner's voice, capacitative sensors can be tuned to have different gain, resolution, and so forth.

In addition to the tuning and calibration processes, the enrollment procedure further comprises a template generation process. In the template generation process, the calibrated biometric sensor takes biometric measurements of the owner and stores the measurements as a template for subsequent authentication operations. In certain embodiments, the templates comprise a series of images, which can be taken of the same or different parts of a subject. The template can comprise high resolution images of the whole or various parts of a fingerprint. The templates can also comprise measurements of different biometric traits, such as a fingerprint image combined with bone density or some other trait. Moreover, the templates can comprise encoded information, such as coefficients representing certain portions or aspects of measured information.

In some embodiments, the biometric authentication system stores a large number of templates for the owner. Due to memory constraints, a system configured to authenticate a single user can typically store more templates, or more detailed templates, for a single owner, compared with a multi-user system. Because additional templates typically contain additional traits, storing more templates can improve the accuracy of authentication operations by requiring an input image to match more stored traits.

As indicated by the foregoing, the calibration of a biometric sensor for a specific user can allow more accurate acquisition of biometric information. This in turn can allow for more precise and comprehensive matching between stored template information and received biometric information. In addition, a single user biometric authentication system can store more templates per user compared with a multi-user system, allowing more traits to be used for authentication. And by matching received biometric information against templates of only one owner, authentication can be performed more quickly compared with systems where received information is compared against templates of numerous users.

A single-user biometric authentication system can be useful in a variety of security settings, particularly those requiring a high level of accuracy. In one example, an automated teller machine (ATM) card or an access badge uses a biometric sensor configured for single-user authentication. The ATM card or badge comprises a fingerprint sensor to ensure that only the owner is able to use it.

FIG. 1 is a diagram illustrating a biometric authentication system 100 according to one embodiment of the inventive concept.

Referring to FIG. 1, biometric authentication system 100 comprises a biometric sensor 105, a display 110, an access controller 115, a processor 120, a database 125, a secured entity 130, and a system bus 135 forming a connection and communication channel for the other elements.

Biometric sensor 105 captures user input during enrollment and authentication procedures, and produces biometric data based on the user input. The user input can be provided by a user interacting with a biometric interface, such as a fingerprint pad for recording fingerprint data, a microphone for collecting voice data, or a camera for capturing images of a face or retina. Alternatively, the user input can be provided without requiring any specific action by the user other than being present at the sensor.

In the enrollment procedure, biometric sensor 105 is calibrated to perform sensing based on the characteristics of a single user or owner. The calibration procedure derives one or more sensing parameters from input data received from the user, and stores the sensing parameters in a memory of processor 120 or database 125.

Following the calibration procedure, biometric sensor 105 captures biometric data to create one or more templates from the owner. The templates are stored in database 125 for subsequent authentication operations of the user. In authentication operations, biometric sensor 105 captures biometric data from user inputs and outputs the biometric data to processor 120.

Biometric sensor 105 can comprise any type of biometric sensing device known to those skilled in the art. These include, for example, fingerprint sensors, voice sensors, retinal scanners, bone density scanners, and various forms of cameras, to name just a few. These devices can also incorporate, or be coupled to, components for performing common types of administrative processing on captured information, such as image registration, data compression, and so on. Moreover, like other operations of biometric sensor 105, the administrative processing can be calibrated to the specifications of a single user.

Display 110 presents information to users of biometric authentication system 100. The information can be provided in any of several forms, such as audio, video, still images, or simple indicator lights. Display 110 typically presents the user with prompts or instructions for performing the enrollment procedure or authentication procedures. For instance, display 110 can instruct the user to place a finger on a fingerprint sensor during the enrollment procedure. Display 110 can also inform the user of successful or unsuccessful authentication.

Access controller 115 comprises a mechanism or device for controlling access to secured entity 130. For instance, in certain embodiments, access controller 115 comprises a mechanism for unlocking a door, a switch for turning on a device, or a software module for admitting access to an application program in a computer system. Access controller 115 operates under the control of processor 120 and is triggered to grant access to secured entity 130 when processor 120 detects the owner based on captured biometric data.

Processor 120 comprises a circuit or chip, such as a central processing unit (CPU), for controlling the operations of elements 105 through 125, and for executing software to authenticate users based on biometric data received from biometric sensor 105 and template information stored in database 125. Processor 120 also executes software for enrollment procedures of biometric sensor 105 and can store calibration parameters generated through the enrollment procedures. During authentication operations, processor 120 can provide the calibration parameters to biometric sensor 105 so that biometric data is captured using the calibration parameters.

Database 125 stores template information used to authenticate the owner of biometric authentication system 100. The template information represents biometric traits of the user, and can be stored in various forms, such as images, codes, or audio files. Although database 125 is shown as a separate element from biometric sensor 105 and processor 120, database 125 and the template information can be integrated with these and other components. For instance, the template information can be stored in a memory embedded in biometric sensor 105 or processor 120.

Secured entity 130 comprises a space, apparatus, or function that is protected by biometric authentication system 100. Examples of secured entity 130 include an ATM or a related bank account, a computer system or device, an automobile, or a building or room. Access to secured entity 130 can be controlled by any of several known security mechanisms, such as locks, alarms, software restrictions, and so forth. And as indicated above, these mechanisms can be controlled through access controller 115.

System bus 135 provides communication pathways for elements 105 through 125. In particular, system bus 135 facilitates communication between processor 120 and biometric sensor 105, display 110, access controller 115, and database 125. System bus 135 typically comprises local bus architectures for elements 105 through 125, and can further comprise one or more network bus architectures for connecting these elements across a network. System bus 135 can implement any of several different communication protocols, including local protocols such as PCMCIA or USB, and network protocols such as TCP-IP and so on.

The various elements of biometric authentication system 100 can be organized in several alternative ways other than those shown in FIG. 1. For instance, certain elements can be integrated into a single unit, such as a system-on-chip comprising biometric sensor 105, processor 120, and database 125. Certain elements can also be distributed across a network. For instance, access controller 115 can be operated remote from biometric sensor 105 so that authentication at one location can trigger access at another location.

The elements of biometric authentication system 100 can also be divided or partitioned in various ways. For instance, in some embodiments, biometric sensor 105, processor 120 and database 125 are included in one unit, such as a smartcard, while access controller 115 and display 110 are included in a separate unit, such as an ATM or a wall mounted access terminal. In such embodiments, authentication can be performed in the unit containing processor 120. Processor 120 can then transmit authentication signals to access controller 115 to gain access.

Figure 2:
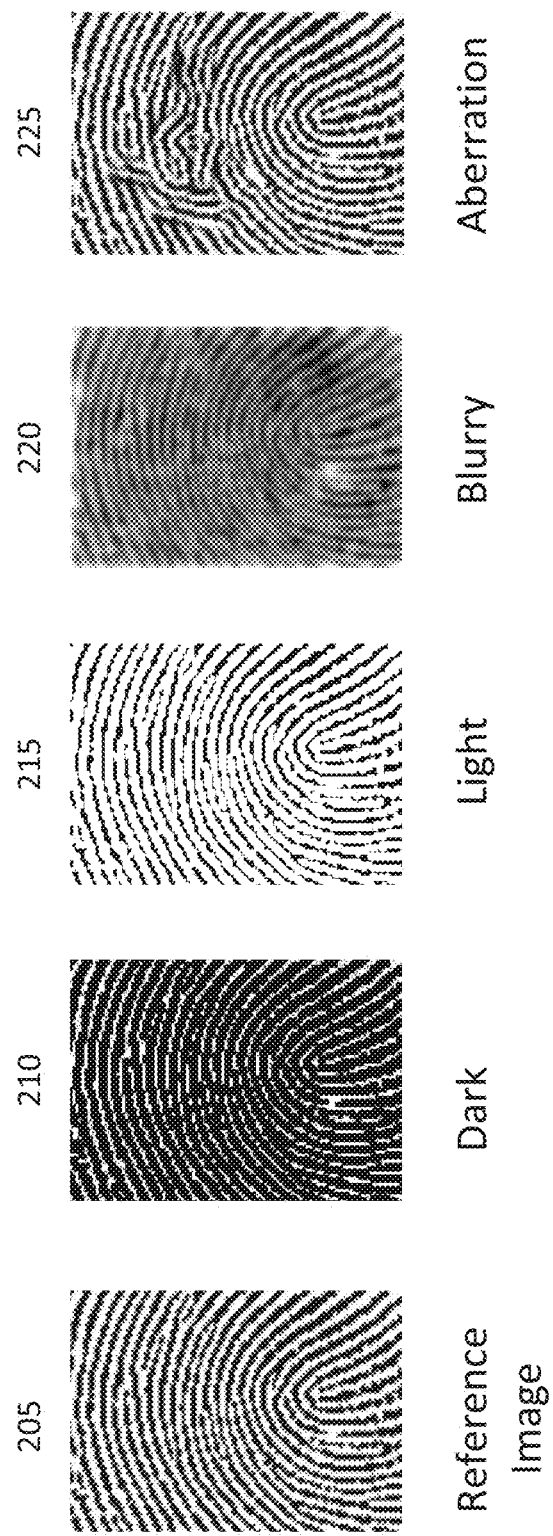
FIG. 2 is a diagram illustrating an example of variation between biometric data captured by different biometric sensors.

FIG. 2 is a diagram illustrating an example of variation between biometric data captured by different biometric sensors. This example demonstrates certain benefits that can be achieved by calibrating biometric authentication system 100 for single user authentication. In this example, the biometric data comprises fingerprint images captured by different fingerprint imagers. The biometric data can take forms other than images and can be derived from other types of sensors.

In FIG. 2, a reference image 205 is stored in a biometric authentication system and other images 210, 215, 220 and 225 are submitted for comparison with reference image 205. For explanation purposes, it will be assumed that images 210 through 225 correspond to the same fingerprint as reference image 205, but were generated by different fingerprint sensors. The different fingerprint sensors have different calibration parameters or other sensing properties compared with the fingerprint sensor used to generate reference image 205. Consequently, images 210 through 225 differ in significant ways from reference image 205, which can prevent the right person from being authenticated based on a comparison between reference image 205 and the other images.

Image 210 is produced by a fingerprint sensor having a relatively low power, sensitivity or contrast. As a result, image 210 is dark and lacks certain features of reference image 205, which can prevent proper authentication.

Image 215 is produced by a fingerprint sensor having excessive contrast, sensitivity, or blooming. As a result, image 215 is lighter and less detailed than reference image 205, which can also prevent proper authentication.

Image 220 is produced by an out of focus fingerprint sensor, so it is blurry, and image 225 is produced by a fingerprint sensor that produces distortion, so it includes an aberration. Both the blurriness and the aberration can prevent proper authentication of the person corresponding to reference image 205.

The differences between images 205 through 225 and the resulting authentication problems highlight a variety of benefits of using a single-user biometric sensor. In particular, the differences demonstrate the increased image quality and number of features that can be produced by an image sensor calibrated to a specific user, and they also demonstrate the relationship between increased image fidelity and strict authentication.

Figure 3:
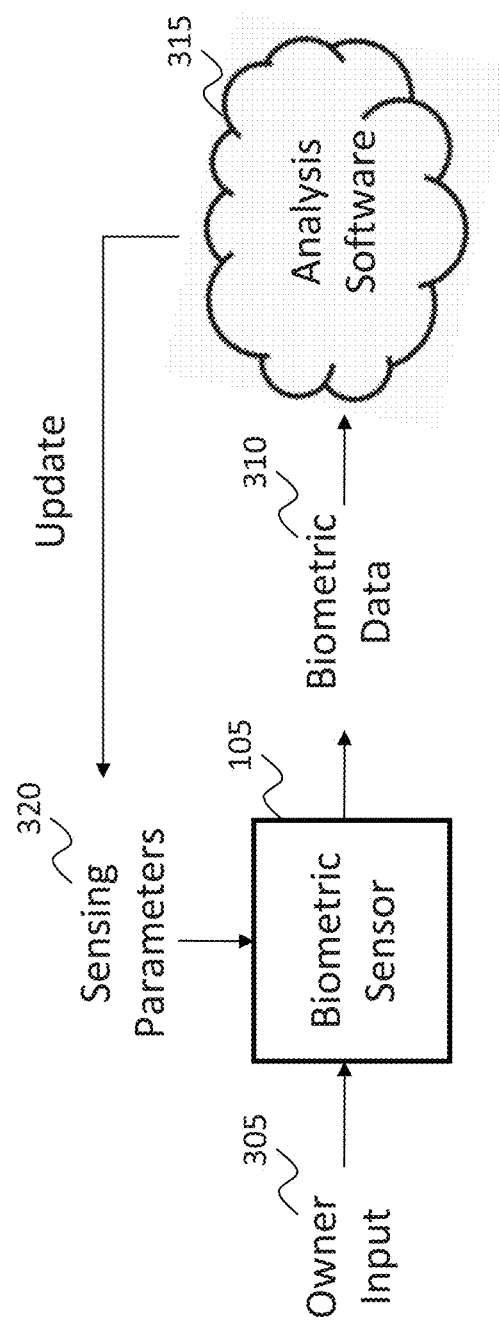
FIG. 3 is a diagram illustrating a method of calibrating a biometric sensor for single-user authentication according to an embodiment of the inventive concept.

FIG. 3 is a diagram illustrating a method of calibrating a biometric sensor for single-user authentication according to an embodiment of the inventive concept. The method of FIG. 3 is typically performed during a user enrollment procedure, and it uses an iterative process to update the parameters of the biometric sensor.

Referring to FIG. 3, an owner of biometric sensor 105 provides owner input 305, such as a fingerprint or other biometric information, to biometric sensor 105. Biometric sensor 105 senses the owner input and produces biometric data 310 based on the owner input. In the sensing operation, biometric sensor 105 uses sensing parameters 320 to determine certain characteristics of biometric data 310. These characteristics can comprise, for instance, a sampling resolution, focus, contrast or filter for an imaging device, or a gain and various frequency filters for an audio sensing device. At the beginning of the calibration method, sensing parameters 320 are typically set to default values.

Biometric data 310 is provided to analysis software 315, which determines whether to update sensing parameters 320. Analysis software 315 typically comprises a software module or application running on a platform such as processor 120.

Analysis software 315 analyzes biometric data 310 and determines whether to update sensing parameters 320 based on the characteristics of biometric data 310. The analysis of biometric data 310 and the updating of sensing parameters 320 are performed in successive loops until biometric data 310 achieves desired characteristics, such as a desired clarity or focus, volume, contrast, intensity of certain signals, or the presence or absence of certain features known to exist in owner input 305. In each loop, new owner input 305 is sensed using the updated sensing parameters 320, and resulting biometric data 310 is analyzed to determine whether to update sensing parameters 320.

Analysis software 315 can also determine whether to update sensing parameters 320 by comparing biometric data 310 from a past iteration with biometric data 310 from a current iteration. For instance, where the quality of biometric data 310 decreases between the past and current iteration, analysis software 315 can identify the biometric data 310 of the past iteration as a local maximum in terms of its quality. Upon detecting such a local maximum, analysis software 315 can terminate the calibration and allow biometric sensor 105 to use the sensing parameters of the past iteration in subsequent authentication operations.

Once analysis software 315 determines acceptable values of sensing parameters 320, the values are fixed so that they can be used in subsequent authentication operations. Because the values of sensing parameters 320 are fixed according to properties of biometric data 310 from the owner, biometric sensor 105 can capture accurate data from the owner, while capturing less accurate data from others. As a result, the calibration procedure improves the ability of biometric sensor 105 to distinguish the owner from other people.

Figure 4:
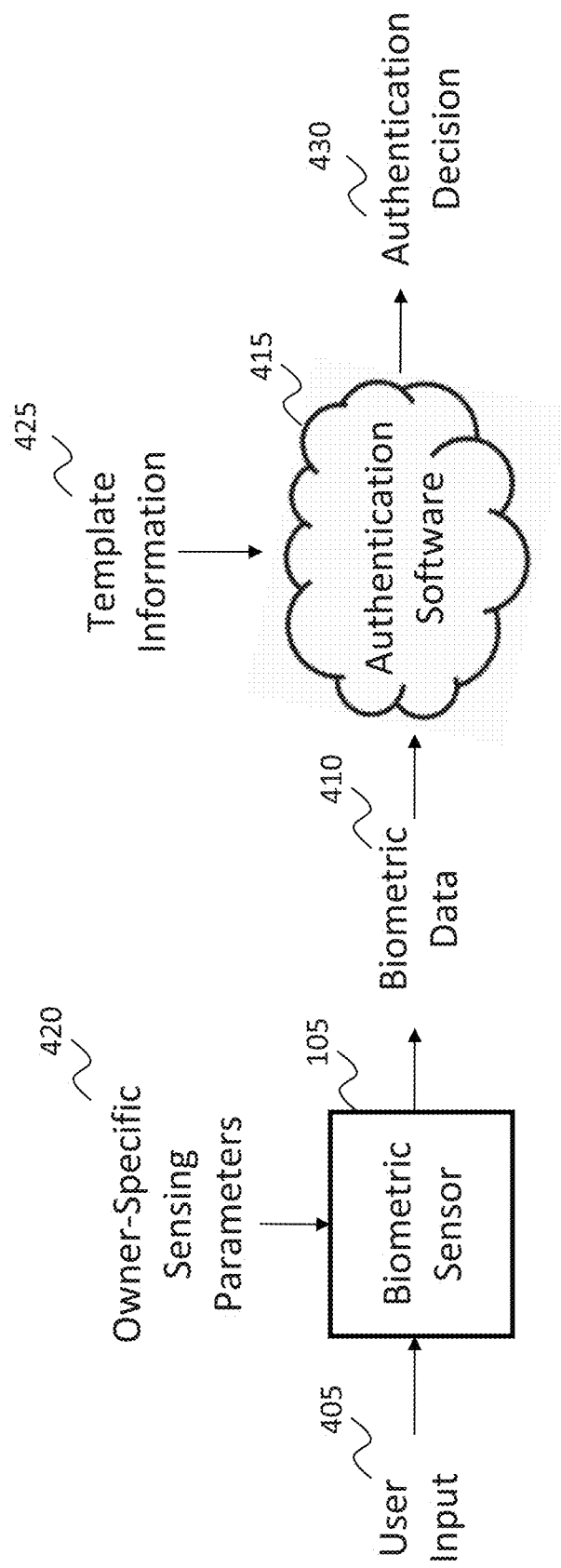
FIG. 4 is a diagram illustrating a method of authenticating an owner of a biometric sensor according to an embodiment of the inventive concept.

FIG. 4 is a diagram illustrating a method of authenticating an owner of a biometric sensor according to an embodiment of the inventive concept. The method of FIG. 4 is performed after the calibration procedure of FIG. 3 has been completed, and it is typically used to control access to a secured entity such as a secured electronic system, building, room, automobile, or other machine.

Referring to FIG. 4, biometric sensor 105 receives user input 405 and owner-specific sensing parameters 420, and generates biometric data 410 by sampling user input 405 with owner-specific sensing parameters 420. User input 405 can comprise input from the owner or from another person. Owner-specific sensing parameters 420 comprise sensing parameters derived from an enrollment procedure such as that illustrated in FIG. 3.

Where user input 405 comprises input from the owner of biometric sensor 105, biometric sensor 105 generates biometric data 410 with a relatively high level of accuracy due to the owner-specific calibration. On the other hand, where user input 405 comprises input from another person, biometric sensor 105 generates biometric data 410 with a relatively low level of accuracy due to the owner-specific calibration.

Authentication software 415 receives biometric data 410 and template information 425 and generates an authentication decision 430 based on a comparison of biometric data 410 with template information 425. For instance, in certain embodiments, authentication software 415 compares traits of template information 425 against biometric data 410, and issues authentication decision 430 based on whether biometric data 410 includes each of the traits. Because biometric data 410 can be generated with a relatively high degree of accuracy for the owner, it is possible to use a relatively large number of traits for the authentication, which can increase the accuracy of authentication.

Authentication software 415 typically comprises a software module or application program running on a platform such as processor 120. Authentication software 415 can receive template information 425 from a source such as database 125 or processor 120. The template information 425 is typically generated in an enrollment procedure as described above.

Further template information can be gathered from authentication operations in which the owner is identified. For instance, where biometric data 410 is identified as the owner's biometric information, it can be used to update template information 425. Moreover, such biometric data 410 can also be used to update owner-specific sensing parameters 420 so that they produce higher quality data.

Authentication decision 430 comprises information indicating whether a user has been authenticated. In certain embodiments, this information comprises one or more signals transmitted to access controller 115 to provide access to secured entity 130. Authentication decision 430 can also comprise one or more signals transmitted to display 110 to indicate that authentication has succeeded or failed.

Figure 5:
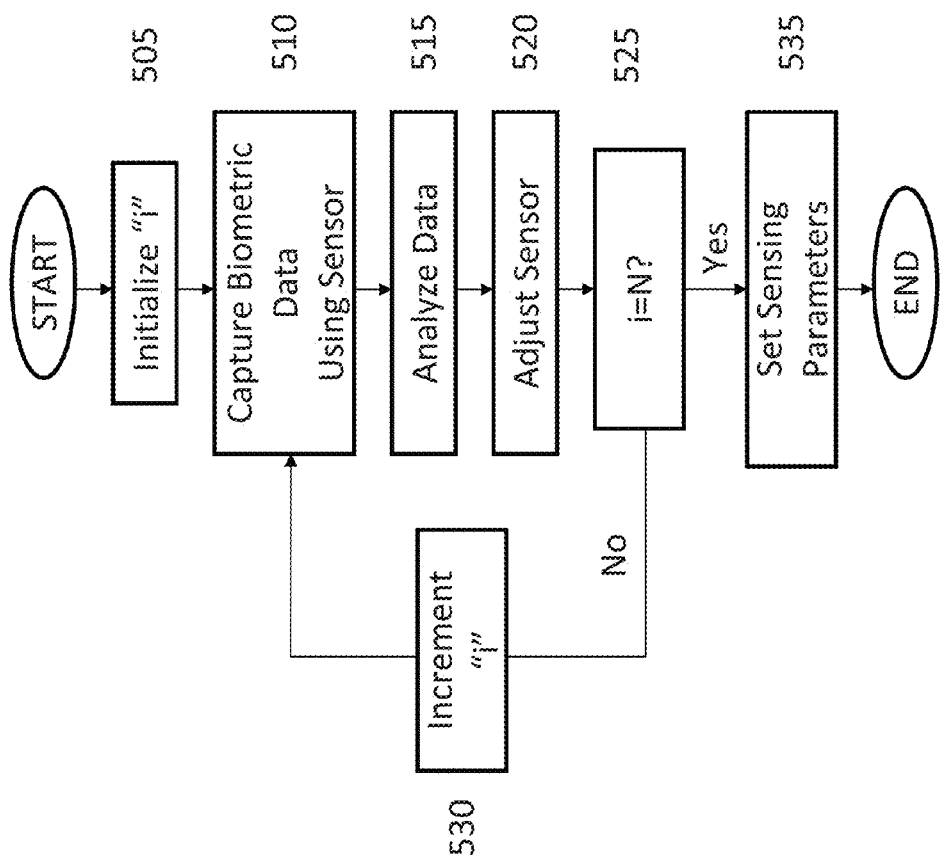
FIG. 5 is a flowchart illustrating a method of calibrating a biometric sensor for single-user authentication according to an embodiment of the inventive concept.

FIG. 5 is a flowchart illustrating a method of calibrating a biometric sensor for single-user authentication according to an embodiment of the inventive concept. In the method of FIG. 5, the biometric sensor is calibrated through an iterative process comprising "N" loops. This method can be performed, for instance, in biometric authentication system 100 of FIG. 1. In the description that follows, example method steps are indicated by parentheses.

The method begins by initializing an index "i" to 1 for a first loop (505). In the first loop, the biometric sensor captures biometric data from an owner of the biometric sensor (510). Thereafter, the biometric data is analyzed to determine its quality (515). For instance, the biometric information can be analyzed to determine whether it forms a clear representation of the owner's traits. Then, based on the analysis, sensing parameters of biometric sensor are adjusted to improve their accuracy (520). For instance, parameters such as the focus, sensitivity, or exposure time of an imaging device can be updated to improve the clarity of features captured by the imaging device.

After the sensing parameters are adjusted in the first loop, the method determines whether a maximum number of loops "N" have been performed by examining the value of "i" (525). Where index "i" is less than "N" (525=No), index "i" is incremented (530) and the method returns to step 510. Otherwise (525=Yes), the adjusted sensing parameters are fixed for subsequent authentication operations (535), and the method terminates.

Although the method of FIG. 5 performs a fixed number of loops, the method could be modified to terminate only after the quality of captured biometric data achieves a desired level. The quality of the captured biometric data can be judged using a metric such as an absolute quality score, an improvement in a quality score, an evaluation score provided through human observation, or an enumeration of recognizable traits or other features. Additionally, the method of FIG. 5 can also be modified to perform template generation by capturing and storing biometric information obtained with the fixed sensing parameters.

Figure 6:
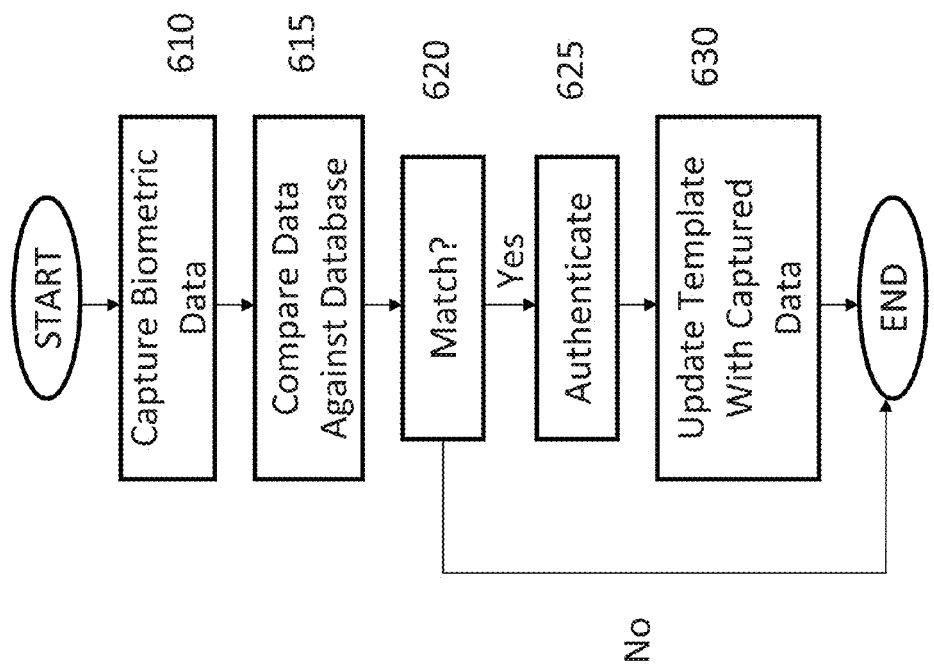
FIG. 6 is a flowchart illustrating a method of authenticating an owner of a biometric sensor according to an embodiment of the inventive concept.

FIG. 6 is a flowchart illustrating a method of authenticating an owner of a biometric sensor according to an embodiment of the inventive concept. Like the method of FIG. 5, this method can be performed using biometric authentication system 100 of FIG. 1, or a similar system.

The method of FIG. 6 begins by capturing biometric data (610) from a user. The captured data can comprise, for instance, fingerprint data, voice data, or other biological information from the user. The biometric data is captured using owner-specific sensing parameters designed to produce relatively high quality information from the owner of the biometric sensor. For instance, where the biometric sensor comprises an image sensor, the owner-specific parameters can define imaging settings that can produce clear images of the owner's traits (e.g., fingerprint, face, retina, etc.) based on specific properties of the owner.

The captured biometric data is compared with template information stored in a memory or database (615). The template information comprises stored biometric data from a single owner of the biometric sensor. The template information typically comprises a large number of traits of the owner so that a high level of similarity is required between the biometric data and the template information in order to authenticate the user.

Based on the comparison, the method determines whether there is a match between the captured biometric data and the template information (620). Upon determining that there is not a match (620=No), the method terminates. Upon determining that there is a match, however, the method proceeds by authenticating the user (625). Authentication of the user typically results in the user gaining access to a secured entity such as a secured device, apparatus, machine, or area. Such access can be granted, for instance, by an access controller as illustrated in FIG. 1.

Following user authentication, the template information can optionally be updated using the captured biometric information (630). Such updates can be used to provide additional traits for matching in subsequent authentication operations. These updates are performed in recognition of the fact that biometric traits can evolve over time, so it is useful to have relatively current information. These updates also recognize that further traits may be gleaned from additional data and authentication using more traits can lead to more robust security.

Figure 7:
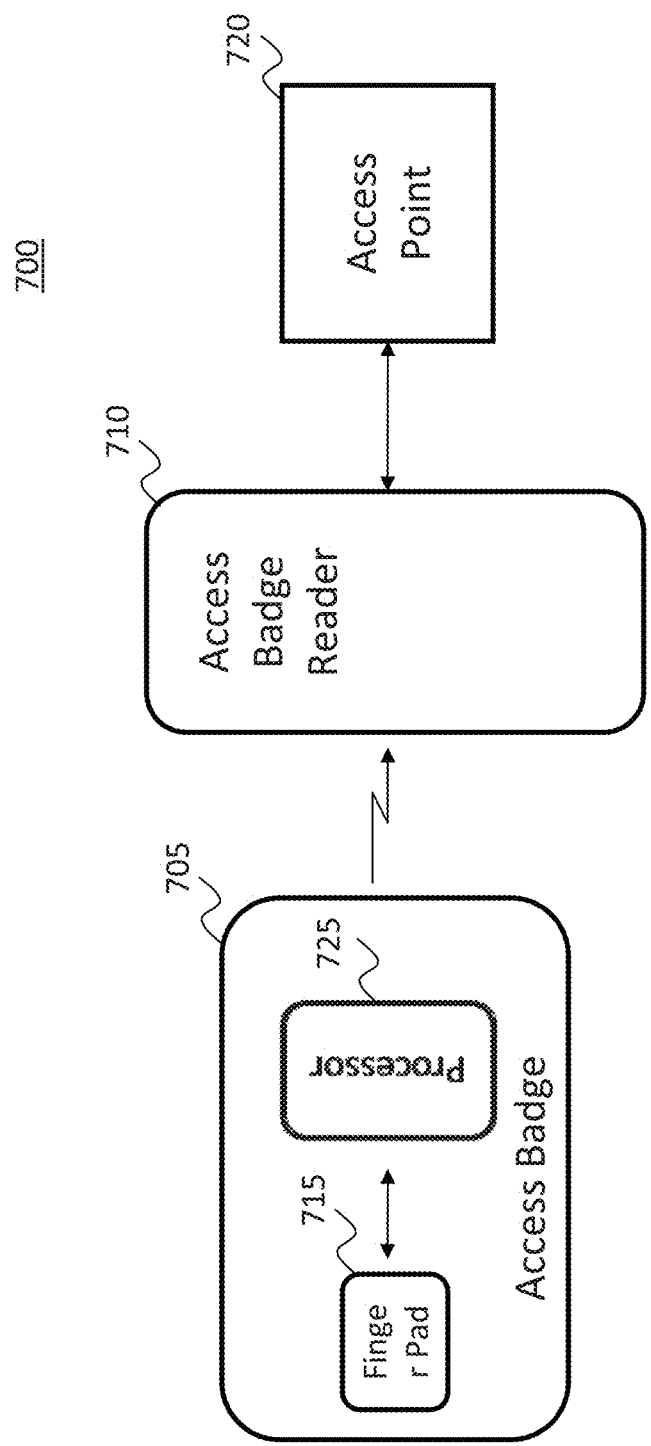
FIG. 7 is a diagram illustrating a biometric authentication system according to an embodiment of the inventive concept.

FIG. 7 is a diagram illustrating a biometric authentication system according to an embodiment of the inventive concept. This illustrates one way of implementing various concepts described above. The inventive concept, however, is not limited to this specific application or embodiment. In the embodiment of FIG. 7, the system comprises a combination of an access badge and an access badge reader such as those used to regulate access to secured locations.

Referring to FIG. 7, a biometric authentication system 700 comprises an access badge 705 and an access badge reader 710. Access badge 705 comprises a finger pad 715 and a processor 725. Access badge reader 710 is coupled to an access point 720, such as a gate or a door.

Access badge 705 is issued to an owner to allow the owner to pass through access point 720. In order for the owner to pass through access point 720, the owner must place a finger on finger pad 715 while located close to access badge reader 710. Finger pad 715 captures fingerprint data using sensing parameters that have been calibrated based on the owner's fingerprint characteristics. By using the owner-specific sensing parameters, finger pad 715 is able to sense the owner's fingerprint with greater clarity compared with other fingerprints, allowing a relatively large number of fingerprint traits to be used to authenticate the owner.

Processor 725 receives the captured fingerprint data from finger pad 715 and compares the fingerprint data with a template stored in a memory of processor 725. In the comparison, processor 725 determines a level of similarity between the captured fingerprint data and the template. This can be accomplished, for instance, by determining whether the fingerprint data contains certain features of the template, such as certain fingerprint patterns. It can also be accomplished, for instance, by comparing an encoded representation of the fingerprint data against an encoded representation of the template and generating a score representing a degree of similarity.

Where processor 725 detects a sufficient level of similarity between the fingerprint data and the template, it transmits an authentication signal to access badge reader 710. Otherwise, upon detecting an insufficient level of similarity, processor 725 can transmit a rejection signal to access badge reader 710. Upon receiving the authentication signal, access badge reader 710 communicates with access point 720 to trigger access for the owner. Upon receiving the rejection signal, access badge reader 710 can provide an indication of the rejection, e.g., by flashing a small red light or sounding a brief buzzer.

In certain embodiments, access badge further comprises a radio frequency identification (RFID) element to be used in conjunction with finger pad 715 and processor 725 to identify the owner. In addition, in some embodiments, processor 725 and/or the template can be stored in access badge reader 710 rather than in access badge 705.

Like other biometric sensors described above, finger pad 715 can be calibrated or tuned to sense the owner through an enrollment procedure. This calibration can allow finger pad 715 to sense the owner with enhanced accuracy compared with other users. Additionally, because access badge 705 is used to authenticate only the owner, access badge 705 can include a relatively large number of traits and/or other information compared with biometric authentication devices used by many users.

Figure 8:
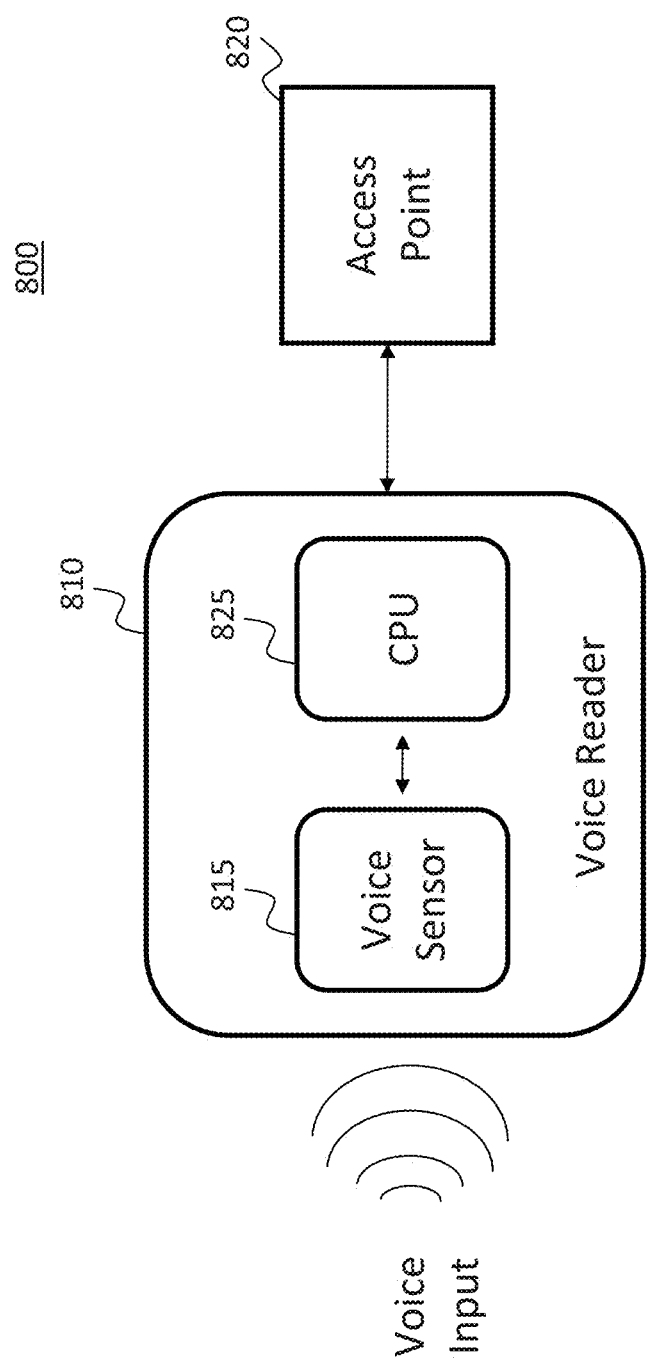
FIG. 8 is a diagram illustrating a biometric authentication system according to an embodiment of the inventive concept.

FIG. 8 is a diagram illustrating a biometric authentication system according to another embodiment of the inventive concept. This embodiment illustrates another way of implementing various concepts described above. In the embodiment of FIG. 8, the system comprises a voice reader used to control passage through an access point.

Referring to FIG. 8, a biometric authentication system 800 comprises a voice reader 810 connected to an access point 820. Voice reader 810 receives voice input and authenticates a user by determining whether the voice input matches voice characteristics of an owner of the voice reader.

Voice reader 810 comprises a voice sensor 815 and a CPU 825. Voice sensor 815 receives the voice input and produces biometric data by sampling the voice input. Voice sensor 815 is calibrated based on voice characteristics of the owner. For instance, voice sensor 815 can be calibrated to capture certain frequencies of the owner's voice. Because voice sensor 815 is calibrated based on the voice characteristics of the owner, it can capture high fidelity samples of the owner's voice, providing many vocal traits that can be used for robust authentication.

In some embodiments, voice reader 810 authenticates the owner based on certain key words. For instance, voice reader 810 may require the owner to speak his or her name or another word. In such embodiments, voice sensor 815 can also be calibrated to sense certain aspects of vocal pronunciation that are unique to the owner.

CPU 825 receives the biometric data from voice sensor 815 and compares the received biometric data with a template to determine whether to authenticate the user. In some embodiments the comparison matches traits of the biometric data with traits in the template and authenticates the user upon determining that a sufficient number of traits are matched.

Upon detecting a match between the biometric data and the template, CPU 825 communicates with access point 820 to allow passage of the owner. Upon detecting that the biometric data does not match the template, CPU 825 communicates with access point 820 to deny passage of the owner. Access point 820 typically comprises a physical or logical entry point, such as a door or gate, or a login screen on a portable device or a computer.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A method of controlling access by a user to a portable electronic device, the portable electronic device including a biometric sensor integrated thereon, the method comprising:
    an enrollment procedure comprising
        capturing initial user input provided by the user using the biometric sensor operating in accordance with a sensing parameter and deriving initial biometric data from the initial user input, wherein the biometric sensor comprises a transducer that converts a biological signal into an electrical or mechanical signal, and the sensing parameter defines at least one characteristic of the conversion,
        analyzing the initial biometric data in relation to the sensing parameter and adjusting the sensing parameter on the basis of analyzed initial biometric data,
        capturing subsequent user input provided by the user using the biometric sensor operating in accordance with the adjusted sensing parameter and deriving subsequent biometric data from the subsequent user input,
        generating template information from the subsequent biometric data and storing the template information in the portable electronic device, and
        storing sensing parameter information indicative of the adjusted sensing parameter in the portable electronic device; and
    using the stored template information and the biometric sensor operating in accordance with the stored sensing parameter information to authenticate access by the user to the portable electronic device.

2. The method of claim 1, wherein the biometric sensor is a fingerprint sensor, the initial user input is an image of a fingerprint of the user, and the subsequent user input is another image of the fingerprint of the user.

3. The method of claim 2, wherein the sensing parameter is one of focus, resolution, and contrast of fingerprint images captured by the fingerprint sensor.

4. The method of claim 1, wherein using the stored template information and the biometric sensor comprises capturing authentication biometric data through operation of the biometric sensor according to the stored sensing parameter information, and comparing the captured authentication biometric data with the stored template information.

5. The method of claim 1, wherein the initial user input comprises multiple samples of biometric data captured with different values of the sensing parameter, and
    said analyzing the initial biometric data in relation to the sensing parameter and adjusting the sensing parameter on the basis of analyzed initial biometric data comprises determining a quality of a current one of the samples and adjusting the sensing parameter to improve the quality of a subsequent one of the samples.

6. The method of claim 1, wherein the biometric sensor comprises a capacitive sensor.

7. The method of claim 6, wherein the capacitive sensor is a capacitive fingerprint sensor.

8. The method of claim 6, wherein the sensing parameter corresponds to a gain or resolution of the capacitive sensor.

9. The method of claim 1, wherein the stored template information comprises at least one captured sample of biometric data.

10. The method of claim 9, wherein the at least one captured sample of biometric data comprises at least two samples corresponding to different forms of biometric data.

11. A method of controlling access to a portable electronic device owned by a single user, the portable electronic device including a biometric sensor integrated thereon, the method comprising:
    generating biometric data corresponding to user input from the single user, the user input being captured by the biometric sensor; and
    comparing the biometric data with template information for the single user stored in the portable electronic device,
    wherein the comparing of the biometric data and template information is made based on sensing parameter information stored in the portable electronic device,
    wherein the sensing parameter information is related to a sensing parameter that controls operation of the biometric sensor and that has been previously derived during an enrollment procedure from user input from the single user as iteratively captured by the biometric sensor,
    wherein the biometric sensor comprises a transducer that converts a biological signal into an electrical or mechanical signal, and the sensing parameter defines at least one characteristic of the conversion, and
    wherein each iterative capture of the user input by the biometric sensor being made in accordance with a different value of the sensing parameter.

12. The method of claim 11, wherein the biometric sensor is a fingerprint sensor.

13. The method of claim 11, wherein the derivation of the sensing parameter comprises analyzing biometric data generated by a first iterative capture of the user input, and adjusting the value of the sensing parameter to improve a quality metric of biometric data generated by a second iterative capture of the user input following the first iterative capture.

14. The method of claim 11, wherein the biometric sensor is a capacitive sensor, and the different values of the sensing parameter correspond to different gain or resolution values of the capacitive sensor.

15. A method of controlling access by a user to a portable electronic device, the portable electronic device including a biometric sensor integrated thereon, the method comprising:
    capturing user input provided by the user using the biometric sensor operating in accordance with a sensing parameter that has been calibrated during an enrollment procedure according to calibration biometric data provided by the user, wherein the biometric sensor comprises a transducer that converts a biological signal into an electrical or mechanical signal, and the sensing parameter defines at least one characteristic of the conversion;
    deriving authentication biometric data from the user input;
    authenticating the user to the portable electronic device based on a comparison between the authentication biometric data and stored template information associated with the user; and as a consequence of authenticating the user to the portable electronic device, updating the template information according to the authentication biometric data.

16. The method of claim 15, further comprising subsequently authenticating the user based on a comparison of the updated template information and subsequent authentication biometric data.

17. The method of claim 15, wherein updating the template information comprises storing the authentication biometric data as part of the template information to be compared with subsequent authentication biometric data.

18. The method of claim 15, further comprising, as a consequence of authenticating the user to the portable electronic device, granting access to at least one application program on the portable electronic device.

* * * * *